(12) United States Patent
Satoh et al.

(10) Patent No.: US 7,752,008 B2
(45) Date of Patent: Jul. 6, 2010

(54) METHOD AND APPARATUS FOR DETERMINING POSITION AND ORIENTATION

(75) Inventors: Kiyohide Satoh, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1262 days.

(21) Appl. No.: 11/126,917

(22) Filed: May 11, 2005

(65) Prior Publication Data

US 2005/0261573 A1 Nov. 24, 2005

(30) Foreign Application Priority Data

May 14, 2004 (JP) .............................. 2004-144892

(51) Int. Cl.
*G01C 9/00* (2006.01)
(52) U.S. Cl. ..................................... 702/150
(58) Field of Classification Search ................. 702/150, 702/151, 152, 153
See application file for complete search history.

(56) References Cited

U.S. PATENT DOCUMENTS

| 6,792,370 B2 | 9/2004 | Satoh et al. | |
|---|---|---|---|
| 7,092,109 B2 * | 8/2006 | Satoh et al. ................. | 356/620 |
| 2004/0090444 A1 | 5/2004 | Satoh | |

FOREIGN PATENT DOCUMENTS

| CN | 1445513 A | 10/2003 |
|---|---|---|
| EP | 1349114 A2 | 10/2003 |
| EP | 1501051 A2 | 1/2005 |
| JP | 2002-259992 | 9/2002 |

OTHER PUBLICATIONS

Hirofumi Fujii, et al. "A Registration Method Using Stereo Cameras with an Inertial Sensor for . . . ", IEICE Technical Report, PRMU 99-192, vol. 99, No. 574, pp. 1-8.
K. Satoh, et al. "Robust Vision-Based Registration Utilizing Bird's-Eye View with User's View," Proc. ISMAR '03, pp. 46-55, 2003.
D. G. Lowe, "Fitting Parameterized Three-Dimensional Models to Images", IEEE Transactions on PAMI, vol. 13, No. 5, pp. 441-450, 1991.
Takahashi, et al., "A High-Accuracy Realtime 3D Measuring Method of Marker for VR Interface by Monocular Vision", Proceedings of 3D Image Conference '96, pp. 167-172, 1996.
Satoh K, et al: A Head Tracking Method Using Bird's Eye View Camera and Gyroscope' Mixed and Augmented Reality, 2004. Third IEEE and ACM International Symposium on Arlington, VA, USA Nov. 2-5, 2004. pp. 202-211.

(Continued)

*Primary Examiner*—Drew A Dunn
*Assistant Examiner*—Stephen J Cherry
(74) *Attorney, Agent, or Firm*—Canon U.S.A., Inc. I.P. Division

(57) ABSTRACT

An index detector detects image coordinates of indices arranged on a scene from an image shot by an imaging device. An orientation sensor is attached to the imaging device, and outputs a measured orientation. An orientation prediction unit predicts an orientation of the imaging device on the basis of the measured orientation obtained by the orientation sensor. A position/orientation calculator receives the predicted orientation of the imaging device and a set of the image coordinates and world coordinates of each index, determines the position of the imaging device and an update value for an azimuth-drift-error correction value of the orientation sensor, and calculates the position and orientation of the imaging device.

14 Claims, 9 Drawing Sheets

OTHER PUBLICATIONS

You S and Neumann U: "Fusion of Vision and Gyro Tracking for Robust Augmented Reality Registration" IEEE Virtual Reality, Proceedings, IEEE, US, 2001, pp. 71-78.

Foxlin E et al: "An Inertial Head-Orientation Tracker With Automatic Drift Compensation for Use With HMD'S" Virtual Reality Software and Technology Proceedings of the VRST Conference, Aug. 1994, pp. 159-174.

\* cited by examiner

METHOD AND APPARATUS FOR DETERMINING POSITION AND ORIENTATION

BACKGROUND OF THE INVENTION

1. Field of the Invention

The present invention relates to a technique for determining a position and an orientation of an object.

2. Description of the Related Art

Recently, a significant amount of research has been done on mixed reality which aims at a seamless synthesis of a real space and a virtual space. Mixed reality may be shown on an image display device by a video see-through method in which an image of a virtual space (for example, virtual objects drawn by computer graphics or textual information) is superimposed on an image of a real space shot by an imaging device, such as a video camera. The virtual space is generated depending on the position and orientation of the imaging device.

In addition, mixed reality may also be shown on an optical see-through display attached to the head of a viewer by an optical see-through method in which an image of a virtual space generated depending on the position and orientation of a viewing point of the viewer is displayed.

As applications of these image display devices different from known applications of virtual reality, new fields like surgical assist systems in which the internal state of a patient is superimposed on the patient's body or mixed reality games in which a player fights a virtual enemy in a virtual space are expected.

In both of these new fields of application, there is a demand for accurate registration between the real and virtual spaces, and various experiments have been performed for this purpose. In the video see-through method, accurate determination of position and orientation of the imaging device in a scene (that is, in a world coordinate system) leads to the accurate registration in the mixed reality. Similarly, in the optical see-through method, accurate determination of position and orientation of the viewing point or the display in a scene leads to the accurate registration in the mixed reality.

In the video see-through method, the position and orientation of the imaging device in the scene are generally determined by arranging or setting a plurality of indices, i.e. artificial markers or natural features, in the scene and detecting the coordinates of projections of the indices on an image shot by the imaging device.

In addition, an inertial sensor may be attached to the imaging device, and the position and orientation of the imaging device estimated on the basis of the result of measurement by the sensor may be used in the process of detecting the indices. The result of estimation may also be used as initial values for calculating the position and orientation based on the image or as rough position and orientation in the case in which the indices are not detected. Accordingly, more stable registration can be performed compared to the case in which only the image information is used (refer to, for example, Hirofumi Fujii, Masayuki Kanbara, Hidehiko Iwasa, Haruo Takemura, and Naokazu Yokoya, A Registration Method Using Stereo Cameras with an Inertial Sensor for Augmented Reality, IEICE Technical Report, PRMU 99-192, vol. 99, no. 574, pp. 1-8).

In the optical see-through method, the position and orientation of a target object (that is, the viewer's head or the display) are generally determined by attaching an imaging device (and an inertial sensor) to the target object, determining the position and orientation of the imaging device by the above-described method, and calculating the position and orientation of the target object on the basis of the position and orientation of the imaging device.

A known position/orientation determination apparatus which determines a position and an orientation of an imaging device will be described below with reference to FIG. 1. FIG. 1 shows the structure of the known position/orientation determination apparatus. As shown in FIG. 1, the known position/orientation determination apparatus 100 includes an image input unit 160, a data memory 170, an index detector 110, an orientation sensor unit 140, an orientation prediction unit 150, and a position/orientation calculator 120, and is connected to an imaging device 130.

In addition, as indices to be shot by the imaging device 130 (hereafter simply called indices), a plurality of indices $Q_k$ (k=1 ... $K_1$) are arranged at a plurality of positions in a real space. The positions of the indices $Q_k$ in a world coordinate system (a coordinate system defined by an origin positioned at a certain point in the real space and X, Y, and Z axes which are perpendicular to each other) are known in advance. The indices $Q_k$ can be arranged such that at least three or more of them are always observed on an image obtained by the imaging device 130 when the imaging device 130 is positioned within a target area in which the position and orientation are to be determined. In the example shown in FIG. 1, four indices $Q_1$, $Q_2$, $Q_3$, and $Q_4$ are arranged, and three indices $Q_1$, $Q_3$, and $Q_4$ among them are disposed in the field of view of the imaging device 130.

The indices $Q_k$ may be circular markers of different colors or feature points, such as natural features, having different texture features. Any type of indices may be used as long as image coordinates of projections of the indices on the image are detectable and the indices can be individually distinguished from each other.

The image output by the imaging device 130 (hereafter called a shot image) is input to the position/orientation determination apparatus 100.

The image input unit 160 converts the shot image input to the position/orientation determination apparatus 100 into digital data, stores the data in the data memory 170, and outputs the time at which the image has been input to the orientation prediction unit 150.

The orientation sensor unit 140 is attached to the imaging device 130. The orientation sensor unit 140 measures the current orientation of itself and outputs the measured orientation to the orientation prediction unit 150. The orientation sensor unit 140 is based on a gyro sensor, for example, TISS-5-40 produced by Tokimec Inc. or InertiaCube2 produced by InterSense Inc. may be used. Each of these orientation sensor units generates a drift error which accumulates with time. Therefore, the measured orientation includes an error, and is different from the actual orientation.

The orientation prediction unit 150 receives a calculated orientation of the imaging device 130 (output from the position/orientation calculator 120) at the time corresponding to the previous frame (hereafter called time $\tau-1$) from the data memory 170. In the case in which the imaging device 130 outputs NTSC signals, time $\tau-1$ is 33.3 msec before if the position and orientation are to be determined for each frame, and is 16.7 msec before if the position and orientation are to be determined for each field. In addition, the orientation prediction unit 150 also receives the measured orientation at the time corresponding to the current frame (hereafter called time $\tau$) from the orientation sensor unit 140, predicts the orientation of the imaging device 130 at time $\tau$, and outputs the predicted orientation to the data memory 170.

The index detector 110 receives the shot image from the data memory 170 and detects the image coordinates of the indices $Q_k$ included in the image. For example, in the case in which the indices $Q_k$ are markers of different colors, areas corresponding to the colors of the markers in the shot image are detected, and coordinates of the center points of the detected areas are defined as detected coordinates. In addition, in the case in which the indices $Q_k$ are feature points having different texture features, template matching using template images of the indices are performed on the shot image to detect the positions of the indices. In this case, the template images of the indices are stored in advance as known information. The index detector 110 may also receive the calculated position of the imaging device 130 (output from the position/orientation calculator 120) at time $\tau$ and the predicted orientation (output from the orientation prediction unit 150) from the data memory 170. In such a case, these values are used for predicting the positions of the indices on the image and limiting the search ranges, so that the index detection process can be performed with less calculation load and the risk of false detection or misidentification of the indices can be reduced.

Then, the index detector 110 outputs image coordinates $u^{Qkn}$ and identifiers $k_n$ of the detected indices $Q_{kn}$ to the data memory 170. Here, n (n=1 . . . N) indicates the detected indices, and N shows the total number of the detected indices. For example, in the case shown in FIG. 1, N is 3, and identifiers $k_1=1$, $k_2=3$, and $k_3=4$ and the corresponding image coordinates $u^{Qk1}$, $u^{Qk2}$, and $u^{Qk3}$ are output.

The position/orientation calculator 120 receives the predicted orientation at time $\tau$ and a set of the image coordinates $u^{Qkn}$ and world coordinates $x_W^{Qkn}$ of each index $Q_{kn}$ detected by the index detector 110 from the data memory 170. Then, the position/orientation calculator 120 calculates the position and orientation of the imaging device 130 on the basis of the relationships between the indices using the predicted orientation and the calculated position at time $\tau-1$ as initial values. The thus calculated position and orientation is output to the data memory 170 and to an external device via an interface (I/F) (not shown).

The data memory 170 stores the image input from the image input unit 160, the predicted orientation input from the orientation prediction unit 150, the calculated position and orientation input from the position/orientation calculator 120, the image coordinates and identifiers of the indices input from the index detector 110, and the world coordinates of the indices which are known in advance, and inputs or outputs these data as necessary.

A process performed by the orientation prediction unit 150 included in the known apparatus will be described below with reference to a flowchart shown in FIG. 2.

In Step S2000, the orientation prediction unit 150 determines whether or not a trigger (generated when a new image is input) is input from the image input unit 160. If the trigger is input (yes in Step S2000), the process proceeds to Step S2010. If the trigger is not input, Step S2000 is repeated.

In Step S2010, the orientation prediction unit 150 receives a measured orientation $R^\#$ from the orientation sensor unit 140 ($\#$ represents that the data is obtained as a result of measurement by the sensor), and sets this orientation as the measured orientation $R^\#_\tau$ at time $\tau$.

In Step S2020, the orientation prediction unit 150 receives a calculated orientation $R_{\tau-1}$ at time $\tau-1$ from the data memory 170.

In Step S2030, the orientation prediction unit 150 calculates a relative orientation change $\Delta R^\#$ of the imaging device 130 between time $\tau-1$ and time $\tau$ as follows:

$$\Delta R^\# = (R^\#_{\tau-1} \cdot R_{SC})^{-1} \cdot R^\#_\tau \cdot R_{SC} \qquad (1)$$

$R_{SC}$ represents a 3-by-3 matrix which transforms an orientation in a camera coordinate system (coordinate system in which the position and orientation of the imaging device 130 are expressed) to that in a sensor coordinate system (coordinate system in which the position and orientation of the orientation sensor unit 140 are expressed). $R_{SC}$ is set in advance as known data based on the fixed relationship between the orientation of the orientation sensor unit 140 and that of the imaging device 130.

In Step S2040, the orientation prediction unit 150 calculates a predicted orientation $R^*_\tau$ at time $\tau$ by adding the orientation change $\Delta R^\#$ to the calculated orientation $R_{\tau-1}$ at time $\tau-1$ as follows:

$$R^*_\tau = R_{\tau-1} \cdot \Delta R^\# \qquad (2)$$

Then, the orientation prediction unit 150 outputs the predicted orientation $R^*_\tau$ to the data memory 170.

In Step S2050, the orientation prediction unit 150 determines whether or not to finish the process. If the process is to be continued (no in Step S2050), the measured orientation $R^\#_\tau$ at time $\tau$ is memorized as the measured orientation $R^\#_{\tau-1}$ in the previous cycle, and the process returns to Step S2000.

Next, a process performed by the position/orientation calculator 120 in the known apparatus is described below with reference to a flowchart shown in FIG. 3. In the known structure, the position and orientation of the imaging device 130 are calculated by iterative solution of nonlinear equations.

In the position/orientation calculator 120, the position and orientation of the imaging device 130 to be calculated are internally expressed by three-element vectors $t = [x \ y \ z]^T$ and $\omega = [\xi \psi \zeta]^T$. Accordingly, unknown parameters to be determined are expressed by a six-element state vector $s = [x \ y \ z \ \xi \psi \zeta]^T$.

Although there are various ways to express an orientation with three elements, a three-element vector which defines a rotating angle with the magnitude thereof and a rotating-axis direction with the direction thereof is used in this example. In addition, the orientation $\omega$ may also be expressed using a 3-by-3 rotation matrix R as follows:

$$R(\omega) = \begin{bmatrix} \frac{\xi^2}{\theta^2}(1-\cos\theta) + \cos\theta & \frac{\xi\psi}{\theta^2}(1-\cos\theta) - \frac{\zeta}{\theta}\sin\theta & \frac{\xi\zeta}{\theta^2}(1-\cos\theta) + \frac{\psi}{\theta}\sin\theta \\ \frac{\psi\xi}{\theta^2}(1-\cos\theta) + \frac{\zeta}{\theta}\sin\theta & \frac{\psi^2}{\theta^2}(1-\cos\theta) + \cos\theta & \frac{\psi\zeta}{\theta^2}(1-\cos\theta) - \frac{\xi}{\theta}\sin\theta \\ \frac{\zeta\xi}{\theta^2}(1-\cos\theta) - \frac{\psi}{\theta}\sin\theta & \frac{\zeta\psi}{\theta^2}(1-\cos\theta) + \frac{\xi}{\theta}\sin\theta & \frac{\zeta^2}{\theta^2}(1-\cos\theta) + \cos\theta \end{bmatrix} \qquad (3)$$

where $\theta = \sqrt{\xi^2 + \Psi^2 + \zeta^2}$

Thus, $\omega$ and R may be uniquely transformed into each other. A method for transforming R into $\omega$ is commonly known, and detailed explanations thereof are thus omitted herein.

In Step S3000, the position/orientation calculator 120 receives the predicted orientation $R^*_\tau$ of the imaging device 130 at time $\tau$, and obtains a three-element vector $\omega^*_\tau$ ($=[\xi^*_\tau \psi^*_\tau \zeta^*_\tau]^T$).

In Step S3005, the position/orientation calculator 120 calculates an initial state vector $s=[x_{\tau-1} \ y_{\tau-1} \ z_{\tau-1} \xi^*_\tau \psi^*_\tau \zeta^*_\tau]^T$ by combining the predicted orientation $\omega^*_\tau$ and the calculated vector $t_{\tau-1}$ at time $\tau-1$.

In Step S3010, the position/orientation calculator 120 receives the image coordinates of the indices detected by the index detector 110 from the shot image input at time $\tau$ and the world coordinates of the detected indices from the data memory 170.

In Step S3020, the position/orientation calculator 120 determines whether or not the input information regarding the indices is enough to estimate the position and orientation, and divides the process in accordance with the result of determination. More specifically, if the number of input indices is three or more, the process proceeds to Step S3030. If the number of input indices is less than three, the process proceeds to Step S3090.

In Step S3030, the position/orientation calculator 120 calculates estimated image coordinates $u^{Qkn*}$ for each index $Q_{kn}$. Calculation of the estimated image coordinates $u^{Qkn*}$ is performed by a function of world coordinates $x_W^{Qkn}$ of each index $Q_{kn}$ stored in advance as known information and the current state vector s as follows:

$$u^{Qkn*} = Fc(x_W^{Qkn}, S) \quad (4)$$

The function Fc( ) includes the following equation for obtaining camera coordinates $x_C^{Qkn}$ (coordinate system defined by an origin positioned at a certain point on a camera and X, Y, and Z axes which are perpendicular to each other) of each index from $x_W^{Qkn}$ and s:

$$x_C^{Q_{k_n}} = \begin{bmatrix} x_C^{Q_{k_n}} \\ y_C^{Q_{k_n}} \\ z_C^{Q_{k_n}} \end{bmatrix} = R(\omega)^{-1}(x_W^{Q_{k_n}} - t) \quad (5)$$

and the following equation for obtaining the image coordinates $u^{Qkn*}$ from the camera coordinates $x_C^{Qkn}$:

$$u^{Q^*_{k_n}} = \begin{bmatrix} u_x^{Q^*_{k_n}} & u_y^{Q^*_{k_n}} \end{bmatrix}^T = \begin{bmatrix} -f_x^C \frac{x_C^{Q_{k_n}}}{z_C^{Q_{k_n}}} & -f_y^C \frac{y_C^{Q_{k_n}}}{z_C^{Q_{k_n}}} \end{bmatrix}^T \quad (6)$$

Here, $f^C_x$ and $f^C_y$ are focal lengths of the imaging device 130 along the x axis and the y axis, respectively, and are set in advance as known values.

In Step S3040, the position/orientation calculator 120 calculates errors $\Delta u^{Qkn}$ between the estimated image coordinates $u^{Qkn*}$ and the measured image coordinates $u^{Qkn}$ for each index $Q_{kn}$ as follows:

$$\Delta u^{Qkn} = u^{Qkn} - u^{Qkn*} \quad (7)$$

In Step S3050, the position/orientation calculator 120 calculates an image Jacobian $J_{us}^{Qkn}(=\partial u/\partial s)$ with respect to the state vector s for each index $Q_{kn}$. The image Jacobian $J_{us}^{Qkn}$ is a 2-row by 6-column Jacobian matrix having elements obtained by partial differentiation of function Fc( ) in Equation 4 with the elements of the state vector s. More specifically, first, a 2-row by 3-column Jacobian matrix $J_{ux}^{Qkn}(=\partial u/\partial x)$ having elements obtained by partial differentiation of the right side of Equation 6 with the elements of the camera coordinates $x_C^{Qkn}$ is calculated. In addition, a 3-row by 6-column Jacobian matrix $J_{xs}^{Qkn}(=\partial x/\partial s)$ having elements obtained by partial differentiation of the right side of Equation 5 with the elements of the state vector s is also calculated. Then, the image Jacobian $J_{us}^{Qkn}$ is calculated as follows:

$$J_{us}^{Qkn} = J_{ux}^{Qkn} \cdot J_{xs}^{Qkn} \quad (8)$$

In Step S3060, the position/orientation calculator 120 calculates a correction vector $\Delta s$ for the state vector s on the basis of the errors $\Delta u^{Qkn}$ and the image Jacobians $J_{us}^{Qkn}$ calculated in Steps S3040 and S3050, respectively. More specifically, first, a 2N-dimension error vector is obtained by arranging the errors $\Delta u^{Qkn}$ vertically as follows:

$$U = \begin{bmatrix} \Delta u^{Q_{k_1}} \\ \vdots \\ \Delta u^{Q_{k_N}} \end{bmatrix} \quad (9)$$

In addition, a 2N-row by 6-column matrix is obtained by arranging the image Jacobians $J_{us}^{Qkn}$ vertically as follows:

$$\Theta = \begin{bmatrix} J_{us}^{Q_{k_1}} \\ \vdots \\ J_{us}^{Q_{k_N}} \end{bmatrix} \quad (10)$$

Then, the correction vector $\Delta s$ is calculated using the pseudo inverse matrix $\Theta'$ of $\Theta$ as follows:

$$\Delta s = \Theta' U \quad (11)$$

Since N is 3 in the example shown in FIG. 1, the error vector U a 6-dimension vector, and $\Theta$ is a 6-row by 6-column matrix.

In Step S3070, the position/orientation calculator 120 corrects the state vector s using the correction vector $\Delta s$ calculated at Step S3060, and sets the corrected state vector s as a new estimated state vector s as follows:

$$s + \Delta s \rightarrow s \quad (12)$$

In Step S3080, the position/orientation calculator 120 determines whether or not the calculation is converged using a certain criterion, for example, whether or not the error vector U is smaller than a predetermined threshold or whether or not the correction vector $\Delta s$ is smaller than a predetermined threshold. If the calculation is not converged, the process returns to Step S3030, and Step S3030 and Steps S3030-S3080 are repeated using the corrected state vector s.

If it is determined in Step S3080 that the calculation is converged, the process proceeds to Step S3090 and the position/orientation calculator 120 outputs the obtained state vector s as information of the position and orientation of the imaging device 130 at time $\tau$ (that is, $s_\tau$) The information of the position and orientation may be s itself. Alternatively, a set of the 3-by-3 matrix R representing the orientation and the 3-dimension vector t representing the position calculated from s may also be output.

In Step S3100, the position/orientation calculator 120 determines whether or not to finish the process. If the process is to be continued, the process returns to Step S3000 and input data corresponding to the next frame (time $\tau+1$) and the following frames are subjected to a similar process.

The above-described method is commonly used for determining positions and orientations of imaging devices. In addition, this method is also used to determine positions and orientations of arbitrary target objects (for example, an optical see-through head mounted display (HMD)). In this case, an imaging device is attached to the target object and the position and orientation of the imaging device are determined by the above-described method. Then, the position and orientation of the target object are obtained from the known relationship between the position and orientation of the imaging device and those of the target object.

In the above-described known method, the information obtained from the orientation sensor unit is used only as auxiliary information for predicting the coordinates of the indices or calculating the initial values in the registration process based on the indices detected from the image, and the final estimated position and orientation are determined only from the image information. Therefore, if the input image does not include enough image information to perform stable registration, for example, when the indices are collected in a relatively narrow area of the image, when only three indices are detected, or when errors occur in the index detection, there is a risk that solution with sufficient accuracy and stability cannot be obtained. In addition, when only two or less indices are observed, it is impossible to obtain the solution. Although these problems can be prevented by uniformly setting many indices in the scene, it becomes difficult to distinguish the indices from one another and the appearance of the real space would be degraded in such a case.

SUMMARY OF THE INVENTION

The present invention provides a method and an apparatus for determining position and orientation of an imaging device even when the number of indices observed on an image is small. In addition, the present invention provides a method and an apparatus for obtaining solution with increased stability.

According to one aspect of the present invention, a position/orientation determination method for determining a position and an orientation of a target object includes an image input step of inputting a shot image obtained from an imaging device attached to the target object; an orientation input step of inputting a measured orientation obtained from an orientation sensor which acquires information regarding the orientation of the target object; a feature detection step of obtaining feature values regarding image coordinates of indices arranged on a scene from the shot image as measured feature values; a parameter calculation step of calculating parameters for determining the position and the orientation of the target object; and a position/orientation calculation step of calculating the position and the orientation of the target object using the parameters obtained in the parameter calculation step. In the calculation step, the parameters are determined by repeated calculations using image Jacobians of the feature values with respect to the parameters such that errors between theoretical feature values regarding the image coordinates of the indices and the measured feature values are reduced, the theoretical feature values being obtained on the basis of the measured orientation and estimated parameters and the measured feature values being obtained in the feature detection step.

According to another aspect of the present invention, a position/orientation determination method for determining a position and an orientation of an imaging device which shoots a scene includes an image input step of inputting a shot image obtained from the imaging device; an orientation input step of inputting a measured orientation obtained from an orientation sensor which acquires information regarding the orientation of the imaging device; a feature detection step of obtaining feature values regarding image coordinates of indices arranged on the scene from the shot image as measured feature values; and a calculation step of calculating parameters for determining the position and the orientation of the imaging device. In the calculation step, the parameters are calculated such that errors between the measured feature values being obtained in the feature detection step and their theoretical values being obtained on the basis of the measured orientation and estimated parameters are reduced, using image Jacobians of the theoretical feature values with respect to the parameters.

According to yet another aspect of the present invention, a position/orientation determination method for determining a position and an orientation of an imaging device which shoots a scene includes an image input step of inputting a shot image obtained from the imaging device; an orientation input step of inputting a measured orientation obtained from an orientation sensor which acquires information regarding the orientation of the imaging device; a feature detection step of obtaining feature values regarding image coordinates of indices arranged on the scene from the shot image as measured feature values; a correction-value updating step in which an operator updates an error correction value for the measured orientation; an error correcting step of obtaining a corrected orientation on the basis of the measured orientation and the error correction value; and a calculating step of calculating at least the position of the imaging device using the corrected orientation and the measured feature values regarding the image coordinates of the indices.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Embodiments of the present invention will be described in detail below with reference to the accompanying drawings.

First Embodiment

A position/orientation determination apparatus according to a first embodiment determines a position and an orientation of an imaging device. The position/orientation determination apparatus and a position/orientation determination method according to the present embodiment will be described below.

Figure 4:
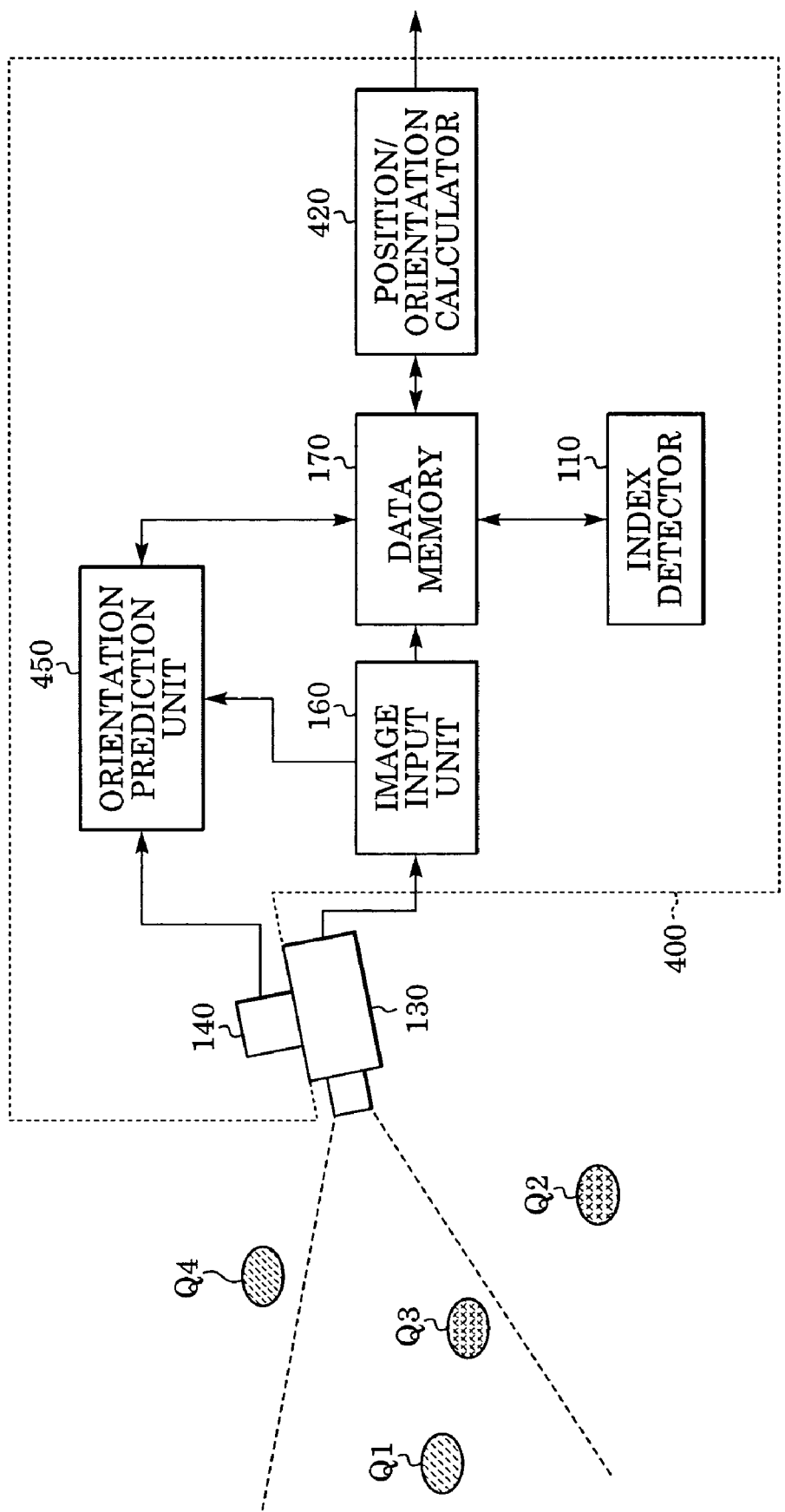
FIG. 4 is a diagram showing the structure of a position/orientation determination apparatus according to a first embodiment.

FIG. 4 shows the structure of the position/orientation determination apparatus according to the present embodiment. As shown in FIG. 4, the position/orientation determination apparatus 400 according to the present embodiment includes an image input unit 160, a data memory 170, an index detector 110, an orientation sensor unit 140, an orientation prediction unit 450, and a position/orientation calculator 420, and is connected to an imaging device 130. In addition, indices to be shot by the imaging device 130 are arranged at a plurality of positions in a real space, similar to the above-described known structure. Operations of the elements denoted by the same reference numerals as in FIG. 1 (that is, operations of the index detector 110, the orientation sensor unit 140, the image input unit 160, and the data memory 170) are similar to those in the above-described known position/orientation determination apparatus, and detailed explanations thereof are thus not repeated here.

The position/orientation calculator 420 receives a predicted orientation of the imaging device 130 and a set of image coordinates $u^{Qkn}$ and world coordinates $x_W^{Qkn}$ of each index $Q_{kn}$ detected by the index detector 110 from the data memory 170. Then, the position/orientation calculator 420 calculates the position and orientation of the imaging device 130 on the basis of the received information and outputs the result of calculation to an external device via an I/F. In addition, the position/orientation calculator 420 also outputs the calculated position of the imaging device 130 to the data memory 170, and updates an azimuth-drift-error correction value of the orientation sensor unit 140 stored in the data memory 170 with an update value for the azimuth-drift-error correction value. The update value is derived in the step of calculating the position and orientation.

Differences between the position/orientation calculator 420 according to the present embodiment and the position/orientation calculator 120 used in the known structure are described below. In the position/orientation calculator 120, the estimated orientation input from the orientation prediction unit 150 is used only to obtain initial values for calculation. In comparison, in the present embodiment, some of the predicted values which have sufficient reliability are used as known values instead of unknown parameters. More specifically, in the calculation step performed by the position/orientation calculator 420, it is assumed that the orientation measurement accuracy of the orientation sensor unit 140 is within an allowable range with regard to the inclination angles (pitch and roll angles), and a drift error is included only in the azimuth angle (yaw angle). This assumption is reasonable in the case in which the orientation sensor unit 140 is a gyro-sensor-based unit which has a function of cancelling accumulation of drift errors in the inclination angles using inclinometers which observe the direction of gravity from the earth. An example of an orientation sensor unit which satisfies this assumption is TISS-5-40 produced by Tokimec Inc.

The orientation prediction unit 450 receives an azimuth-drift-error correction value $\phi$ from the data memory 170, corrects the measured orientation input from the orientation sensor unit 140 to predict the orientation of the imaging device 130, and outputs the predicted orientation to the data memory 170.

The image input unit 160, the data memory 170, the index detector 110, the orientation prediction unit 450, and the position/orientation calculator 420 shown in FIG. 4 may be structured as separate devices, or be provided as software programs installed in one or more computers and executed by central processing units (CPUs) included in the respective computers. According to the present embodiment, the image input unit 160, the data memory 170, the index detector 110, the orientation prediction unit 450, and the position/orientation calculator 420 are structured as software programs executed in a single computer.

Figure 5:
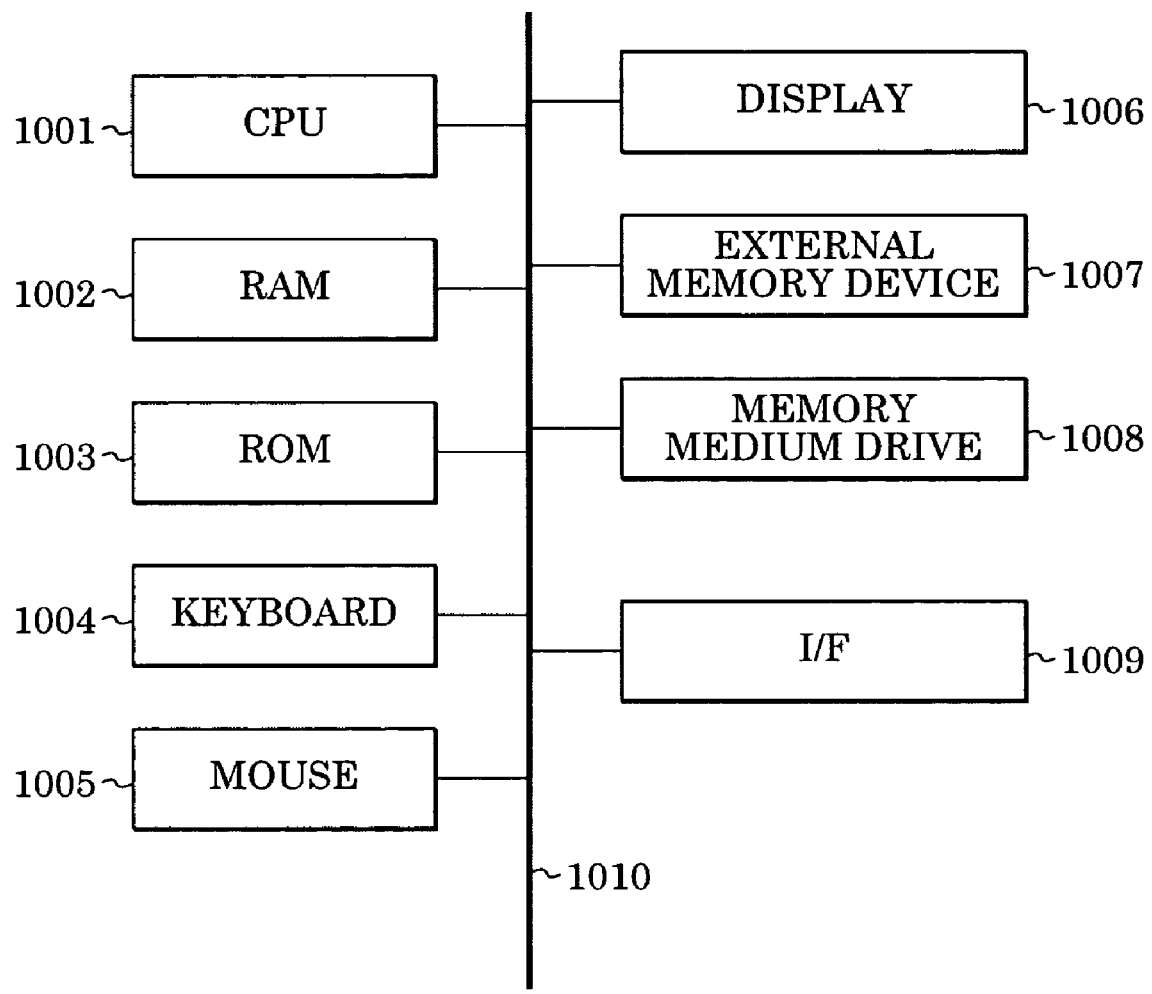
FIG. 5 is a diagram showing the basic structure of a computer.

FIG. 5 shows the basic structure of the computer which executes the software programs corresponding to the image input unit 160, the data memory 170, the index detector 110, the orientation prediction unit 450, and the position/orientation calculator 420.

A CPU 1001 controls the overall computer using programs and data stored in a random access memory (RAM) 1002 or a read-only memory (ROM) 1003. In addition, the CPU 1001 executes the software programs corresponding to the image input unit 160, the index detector 110, the orientation prediction unit 450, and the position/orientation calculator 420 to provide the functions thereof.

The RAM 1002 includes a memory area which temporarily stores programs and data loaded from an external memory device 1007 or a memory medium drive 1008 and a work area used by the CPU 1001 to perform various processes. The RAM 1002 provides the function of the data memory 170.

The ROM 1003 generally stores programs and set data for the computer. In addition, a keyboard 1004 and a mouse 1005 are used by an operator to input various commands into the CPU 1001.

A display 1006 includes a cathode ray tube (CRT), a liquid crystal panel, etc., and displays messages to be displayed in position/orientation determination of the imaging device 130.

The external memory device 1007 functions as a mass storage system, such as a hard disc, and stores an operating system (OS) and the software programs. In the present embodiment, information known in advance is stored in the external memory device 1007, and is loaded into the RAM 1002 as necessary.

The memory medium drive 1008 reads out programs and data stored in a memory medium, such as a CD-ROM (compact disc-ROM) and a DVD-ROM (digital versatile disc-ROM), in accordance with a command from the CPU 1001, and outputs the programs and data to the RAM 1002 or the external memory device 1007.

An I/F 1009 includes an analog video port or a digital input/output port, such as IEEE 1394, for providing connection to the imaging device 130, a serial port, such as RS232C and USB, for providing connection to the orientation sensor unit 140, and an Ethernet port for outputting the calculated position and orientation of the imaging device 130 to an external device. Data from the above-described components are input to the RAM 1002 via the I/F 1009. The I/F 1009 serves a part of the function of the image input unit 160.

A bus 1010 connects the above-described components to each other.

Figure 6:
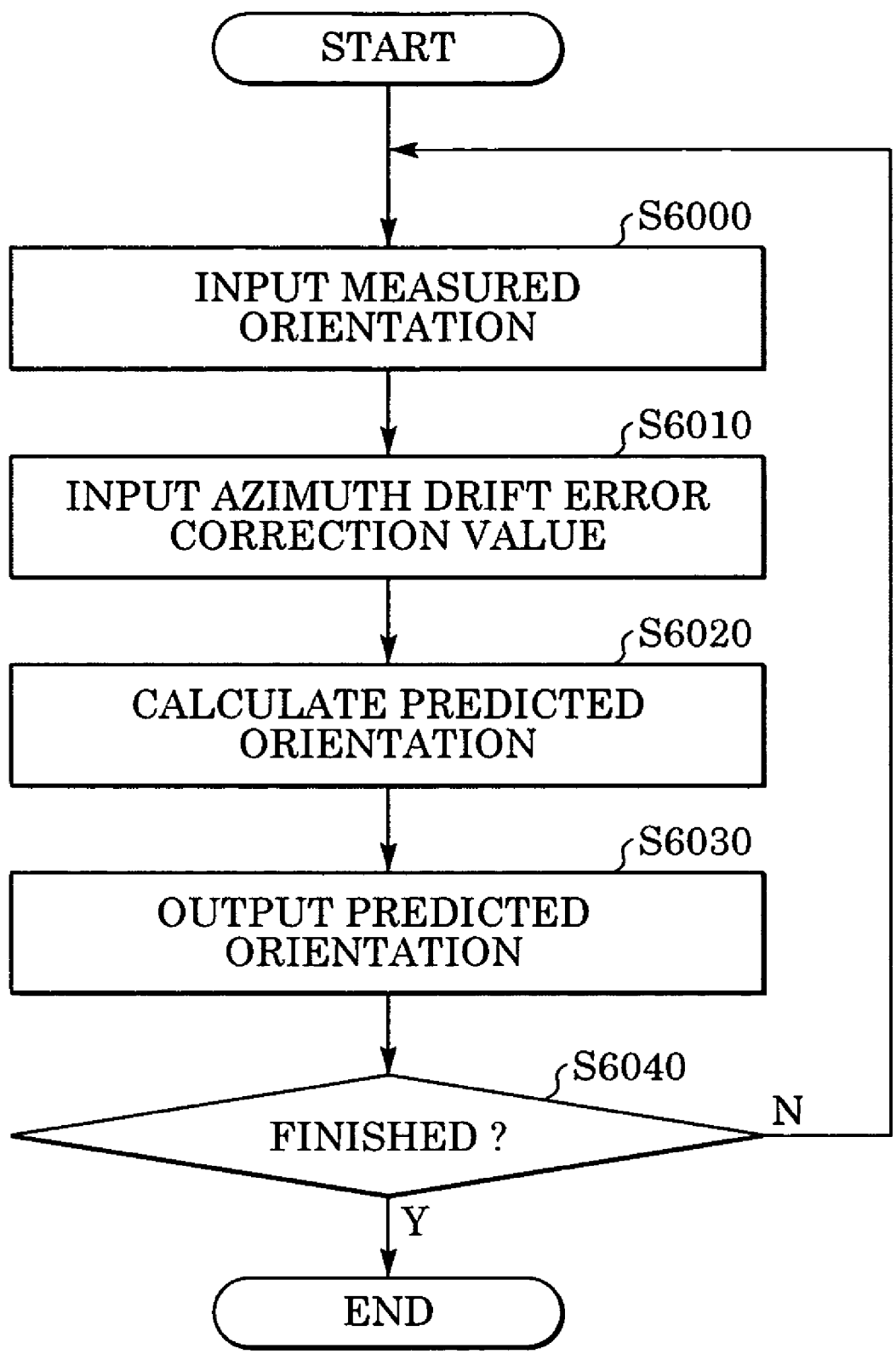
FIG. 6 is a flowchart showing a process of calculating parameters representing a position and an orientation of an imaging device performed when a CPU executes a software program corresponding to an orientation prediction unit.

FIG. 6 is a flowchart showing a process performed by the orientation prediction unit 450. This process is carried out when the CPU 1001 executes a software program corresponding to the orientation prediction unit 450. The program code corresponding to this flowchart is loaded into the RAM 1002 before the process is started.

In Step S6000, the orientation prediction unit 450 receives a measured orientation $R^\#$ from the orientation sensor unit 140.

In Step S6010, the orientation prediction unit 450 receives an azimuth-drift-error correction value $\phi^*$ from the data memory 170.

In Step S6020, the orientation prediction unit 450 subjects the measured orientation $R^\#$ (orientation of the orientation sensor unit 140) to a transformation from the orientation of the orientation sensor unit 140 into that of the imaging device 130, and performs drift error correction using the azimuth-drift-error correction value $\phi^*$. The thus obtained orientation of the imaging device 130 after the azimuth-drift-error correction is set as a predicted orientation $R^*$ as follows:

$$R^* = \Delta R(\phi^*) \cdot R^\# \cdot R_{SC} \qquad (13)$$

where $\Delta R(\phi)$ is a rotation matrix representing a rotation by $\phi$ in the azimuth angle, and is expressed as a function of $\phi$ as follows:

$$\Delta R(\phi) = \begin{bmatrix} l_1 l_1 (1-\cos\phi) + \cos\phi & l_2 l_1 (1-\cos\phi) - l_3 \sin\phi & l_3 l_1 (1-\cos\phi) + l_2 \sin\phi \\ l_1 l_2 (1-\cos\phi) + l_3 \sin\phi & l_2 l_2 (1-\cos\phi) + \cos\phi & l_3 l_2 (1-\cos\phi) - l_1 \sin\phi \\ l_1 l_3 (1-\cos\phi) - l_2 \sin\phi & l_2 l_3 (1-\cos\phi) + l_1 \sin\phi & l_3 l_3 (1-\cos\phi) + \cos\phi \end{bmatrix} \qquad (14)$$

Here, $l = (l_1, l_2, l_3)$ shows a known vector representing the vertically upward direction (direction opposite to the gravity from the earth) in the world coordinate system.

In Step S6030, the orientation prediction unit 450 outputs the predicted orientation $R^*$ to the data memory 170.

In Step S6040, the orientation prediction unit 450 determines whether or not to finish the process. If the process is to be continued, the process returns to Step S6000.

Figure 7:
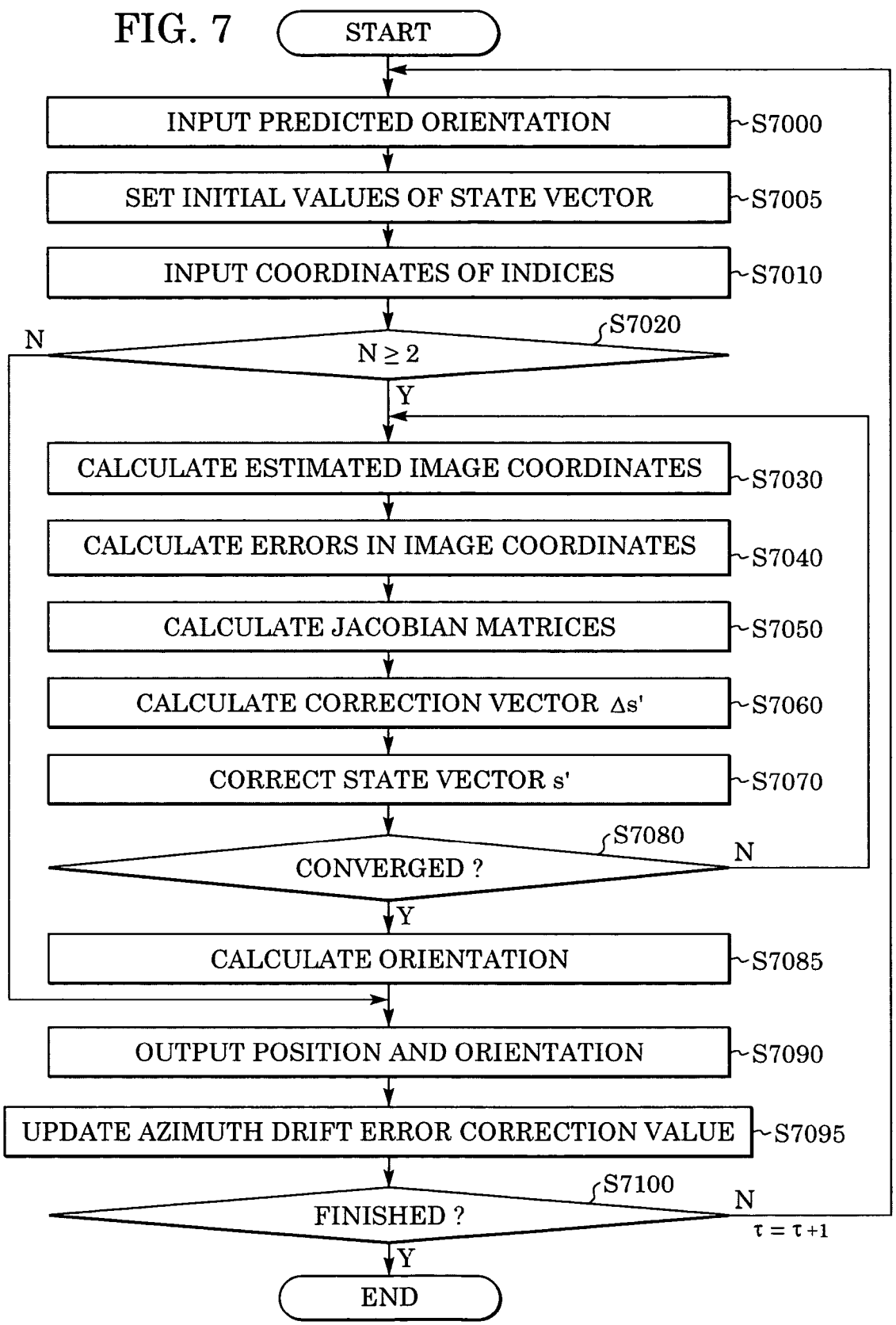
FIG. 7 is a flowchart showing a process of calculating parameters representing the position and orientation of the imaging device performed when the CPU executes a software program corresponding to a position/orientation calculator.

FIG. 7 is a flowchart showing a process of calculating parameters representing the position and orientation of the imaging device 130. This process is carried out when the CPU 1001 executes a software program corresponding to the position/orientation calculator 420. The program code corresponding to this flowchart is loaded into the RAM 1002 before the process is started.

Different from the position/orientation calculator 120 in the above-described known structure, the position/orientation calculator 420 calculates four parameters including elements representing the position of the imaging device 130 ($t = [x\ y\ z]^T$) and an update value $\phi$ for the azimuth-drift-error correction value of the orientation sensor unit 140 as unknown parameters. Thus, in the present embodiment, not all of the elements representing the orientation are treated as unknown parameters. More specifically, a model is applied in which it is assumed that only the azimuth angle includes a drift error in the predicted orientation $R^*$ and that an accurate orientation can be obtained by determining only the update value $\phi$ for the azimuth-drift-error correction value. In the following description, the unknown parameters to be determined are described by a four-element state vector $s' = [x\ y\ z\ \phi]^T$.

In Step S7000, the position/orientation calculator 420 receives the predicted orientation $R^*$ of the imaging device 130 (output from the orientation prediction unit 450) from the data memory 170.

In Step S7005, the position/orientation calculator 420 sets an initial state vector $s'$ as $s' = [x_{\tau-1}\ y_{\tau-1}\ z_{\tau-1}\ 0]^T$. Here, $x_{\tau-1}$, $y_{\tau-1}$, and $z_{\tau-1}$ show the position of the imaging device (target) 130 calculated at Step S7090 in the previous cycle (at time $\tau-1$).

In Step S7010, the position/orientation calculator 420 receives the image coordinates of the indices detected by the index detector 110 and the world coordinates thereof from the data memory 170. For example, in the case shown in FIG. 4, the number N of the detected indices is 2, and the position/orientation calculator 420 receives image coordinates $u^{Qk1}$ and $u^{Qk3}$ and world coordinates $x_W^{Qk1}$ and $x_W^{Qk3}$.

In Step S7020, the position/orientation calculator 420 determines whether or not the input information regarding the indices is enough to estimate the position and orientation, and divides the process in accordance with the result of determination. More specifically, if the number of input indices is two or more, the process proceeds to Step S7030. If the number of input indices is less than two, the process proceeds to Step S7090.

In Step S7030, the position/orientation calculator 420 calculates estimated image coordinates $u^{Qkn*}$ for each index $Q_{kn}$ on the basis of a function of the state vector $s'$ as follows:

$$u^{Qkn*} = Fc'(x_W^{Qkn}, s') \qquad (15)$$

More specifically, the function $Fc'(\ )$ includes Equation 6 for obtaining the image coordinates $u^{Qkn*}$ from the camera coordinates $x_C^{Qkn}$ and the following function for obtaining the camera coordinates $x_C^{Qkn}$ from the world coordinates $x_W^{Qkn}$ and $s'$:

$$x_C^{Q_{k_n}} = \begin{bmatrix} x_C^{Q_{k_n}} \\ y_C^{Q_{k_n}} \\ z_C^{Q_{k_n}} \end{bmatrix} = (\Delta R(\phi) \cdot R^*)^{-1} (x_W^{Q_{k_n}} - \begin{bmatrix} x \\ y \\ z \end{bmatrix}) \qquad (16)$$

Here, $R^*$ shows the predicted orientation obtained in Step S7000. In addition, $\Delta R(\phi)$ shows a rotation matrix representing a rotation by $\phi$ in the azimuth angle, and is expressed as in Equation 14.

In Step S7040, the position/orientation calculator 420 calculates errors $\Delta u^{Qkn}$ between the estimated image coordinates $u^{Qkn*}$ and the measured image coordinates $u^{Qkn}$ for each index $Q_{kn}$ from Equation 7.

In Step S7050, the position/orientation calculator 420 calculates an image Jacobian $J_{us'}^{Qkn}$ ($=\partial u/\partial s'$) with respect to the state vector $s'$ for each index $Q_{kn}$. The image Jacobian $J_{us'}^{Qkn}$ is a 2-row by 4-column Jacobian matrix having elements obtained by partial differentiation of function $Fc'(\ )$ in Equation 15 with the elements of the state vector $s'$. More specifically, first, a 2-row by 3-column Jacobian matrix $J_{ux}^{Qkn}$ ($\partial u/$ ∂x) having elements obtained by partial differentiation of the right side of Equation 6 with the elements of the camera coordinates $x_C^{Qkn}$ is calculated. In addition, a 3-row by 4-column Jacobian matrix $J_{xs'}^{Qkn}$ (=∂x/∂s') having elements obtained by partial differentiation of the right side of Equation 16 with the elements of the state vector s' is also calculated. Then, the image Jacobian $J_{us'}^{Qkn}$ is calculated by Equation 8 in which s' is substituted for s.

In Step S7060, the position/orientation calculator 420 calculates a correction vector Δs' for the state vector s' on the basis of the errors $Δu^{Qkn}$ and the image Jacobians $J_{us'}^{Qkn}$ calculated in Steps S7040 and S7050, respectively. More specifically, first, a 2N-dimension error vector U is obtained by arranging the errors $Δu^{Qkn}$ vertically and a 2N-row by 4-column matrix Θ is obtained by arranging the image Jacobians $J_{us'}^{Qkn}$ vertically. Then the correction vector Δs' is calculated using the pseudo inverse matrix Θ' of Θ using Equation 11 in which s' is substituted for s. Since N is 2 in the example shown in FIG. 4, the error vector U is a 4-dimension vector, and Θ is a 4-row by 4-column matrix.

In Step S7070, the position/orientation calculator 420 corrects the state vector s' in accordance with Expression 12 in which s' is substituted for s using the correction vector Δs' calculated at Step S7060, and sets the corrected state vector s' as a new estimated state vector s'.

In Step S7080, the position/orientation calculator 420 determines whether or not the calculation is converged using a certain criterion, for example, whether or not the error vector U is smaller than a predetermined threshold or whether or not the correction vector Δs' is smaller than a predetermined threshold. If the calculation is not converged, the process returns to Step S7030, and Steps S7030-S7080 are repeated using the corrected state vector s'.

If it is determined that the calculation is converged in Step S7080, the process proceeds to Step S7085, and the position/orientation calculator 420 calculates the orientation of the imaging device 130 from the obtained state vector s'. More specifically, the update value φ for the azimuth-drift-error correction value is determined from the state vector s', and the orientation R of the imaging device 130 is calculated using the update value φ as follows:

$$R = ΔR(φ) \cdot R^* \quad (17)$$

In Step S7090, the position/orientation calculator 420 outputs the information of the position and orientation of the imaging device 130 to an external device via the I/F 1009, and also outputs the position t of the imaging device 130 to the data memory 170. The position and orientation may be output as a set of the 3-by-3 matrix R representing the orientation and the 3-dimension vector t representing the position, Euler angles obtained by transforming the elements of the orientation, a viewing transformation matrix of the imaging device 130 calculated from the position and orientation, or by any other position/orientation description methods.

In Step S7095, the position/orientation calculator 420 updates the azimuth-drift-error correction value φ* stored in the data memory 170 using the update value φ for the azimuth-drift-error correction value obtained by the foregoing calculation steps as follows:

$$φ^* + φ \rightarrow φ^* \quad (18)$$

In Step S7100, the position/orientation calculator 420 determines whether or not to finish the process. If the process is to be continued, the process returns to Step S7000 and input data corresponding to the next frame (time τ+1) and the following frames is subjected to a similar process.

Accordingly, the position and orientation of the imaging device is determined. In the known position/orientation determination apparatus, three or more indices are necessary to determine the position and orientation of the imaging device. In addition, when only three indices are provided, solution is unstable (that is, the solution is largely influenced by the errors in coordinate detection of the indices) since the input data has no redundancy. In comparison, in the position/orientation determination apparatus according to the present embodiment, the position and orientation of the imaging device can be measured even when only two indices are observed on the image. In addition, since the number of parameters to be determined are small, when three or more indices are obtained, the redundancy of the information is relatively increased and more stable solution can be obtained compared to the known method. This advantage is particularly effective when the number of indices is three. Accordingly, the number of indices necessary for obtaining a solution with certain stability are reduced, and the risk that no solution can be obtained are also reduced. As a result, the number of markers to be provided on the scene can be reduced. Therefore, the rate of false detection can be reduced and the accuracy can be increased accordingly. In addition, the appearance can be prevented from being degraded by the markers.

Second Embodiment

In the first embodiment, the position and orientation of the imaging device itself which moves in a space are determined. In comparison, a position/orientation determination apparatus according to a second embodiment determines a position and an orientation of an arbitrary target object, and is structured such that a camera for obtaining a shot image is attached to the position/orientation determination apparatus according to the first embodiment. The position/orientation determination apparatus and a position/orientation determination method according to the second embodiment are described below.

Figure 8:
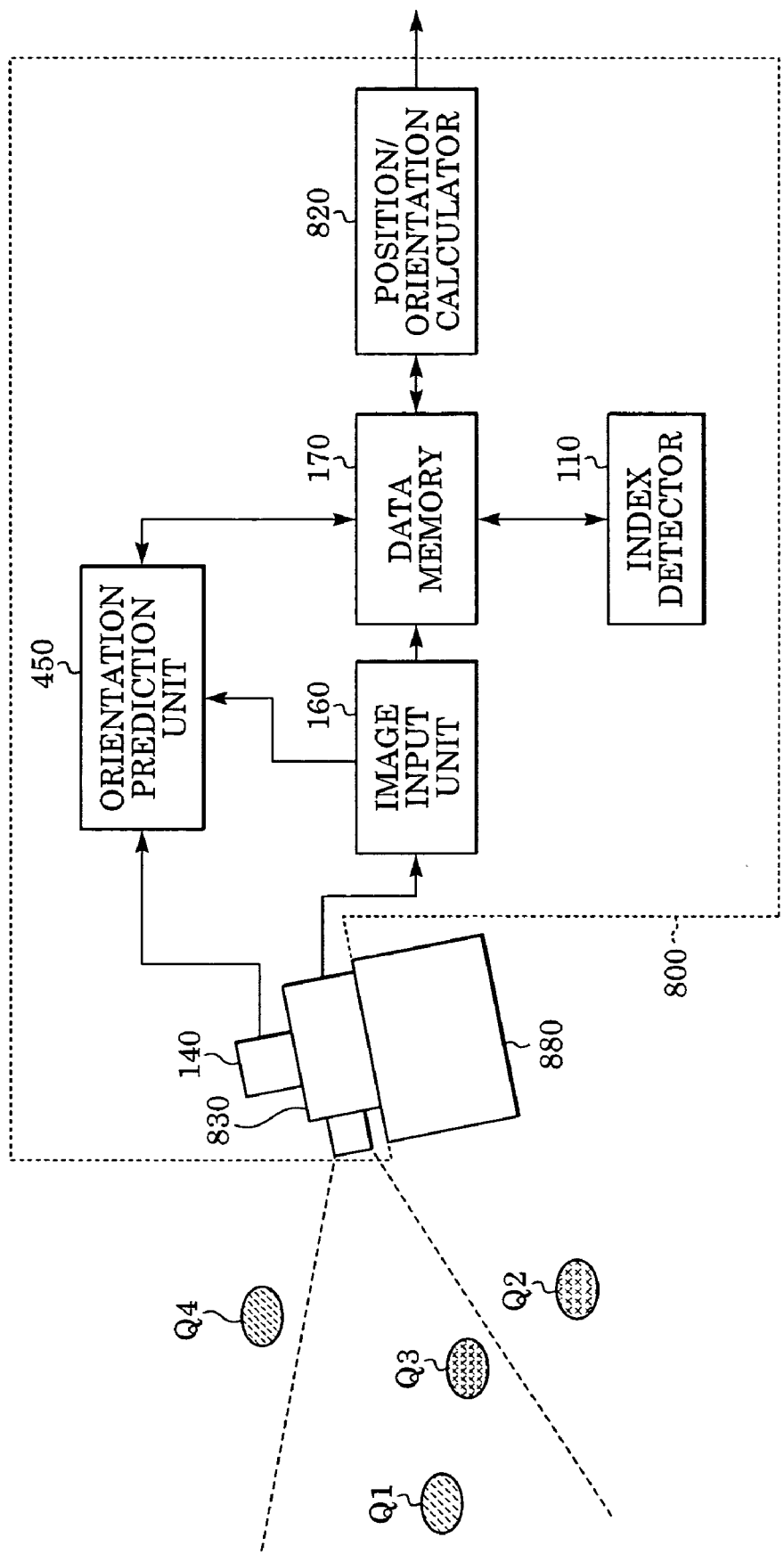
FIG. 8 is a diagram showing the structure of a position/orientation determination apparatus according to a second embodiment.

FIG. 8 shows the structure of the position/orientation determination apparatus according to the present embodiment. As shown in FIG. 8, the position/orientation determination apparatus 800 according to the present embodiment includes an image input unit 160, a data memory 170, an index detector 110, an orientation sensor unit 140, an orientation prediction unit 450, a position/orientation calculator 820, and an imaging device 830.

Figure 1:
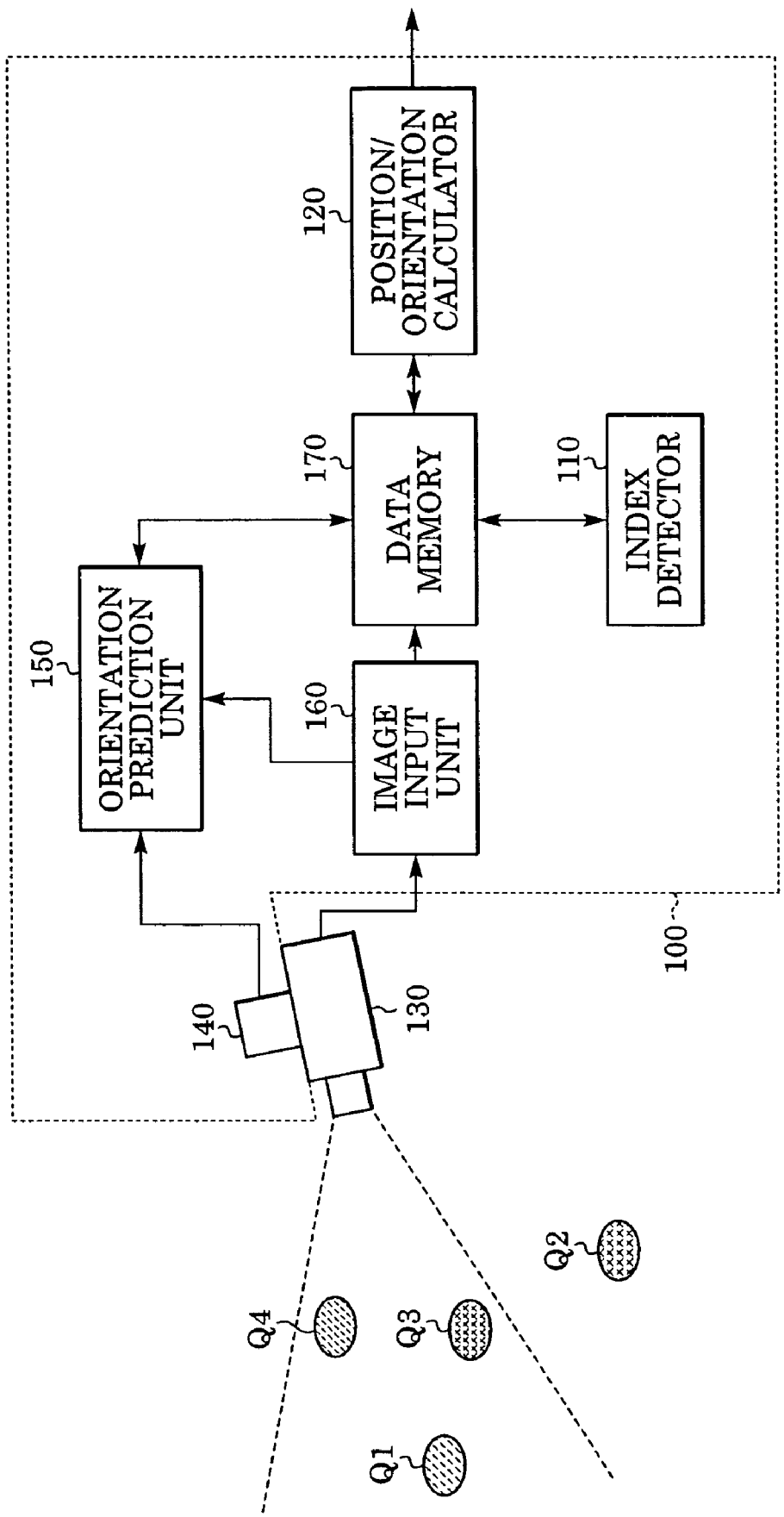
FIG. 1 is a diagram showing the structure of a known position/orientation determination apparatus which determines a position and an orientation of an imaging device.
Figure 2:
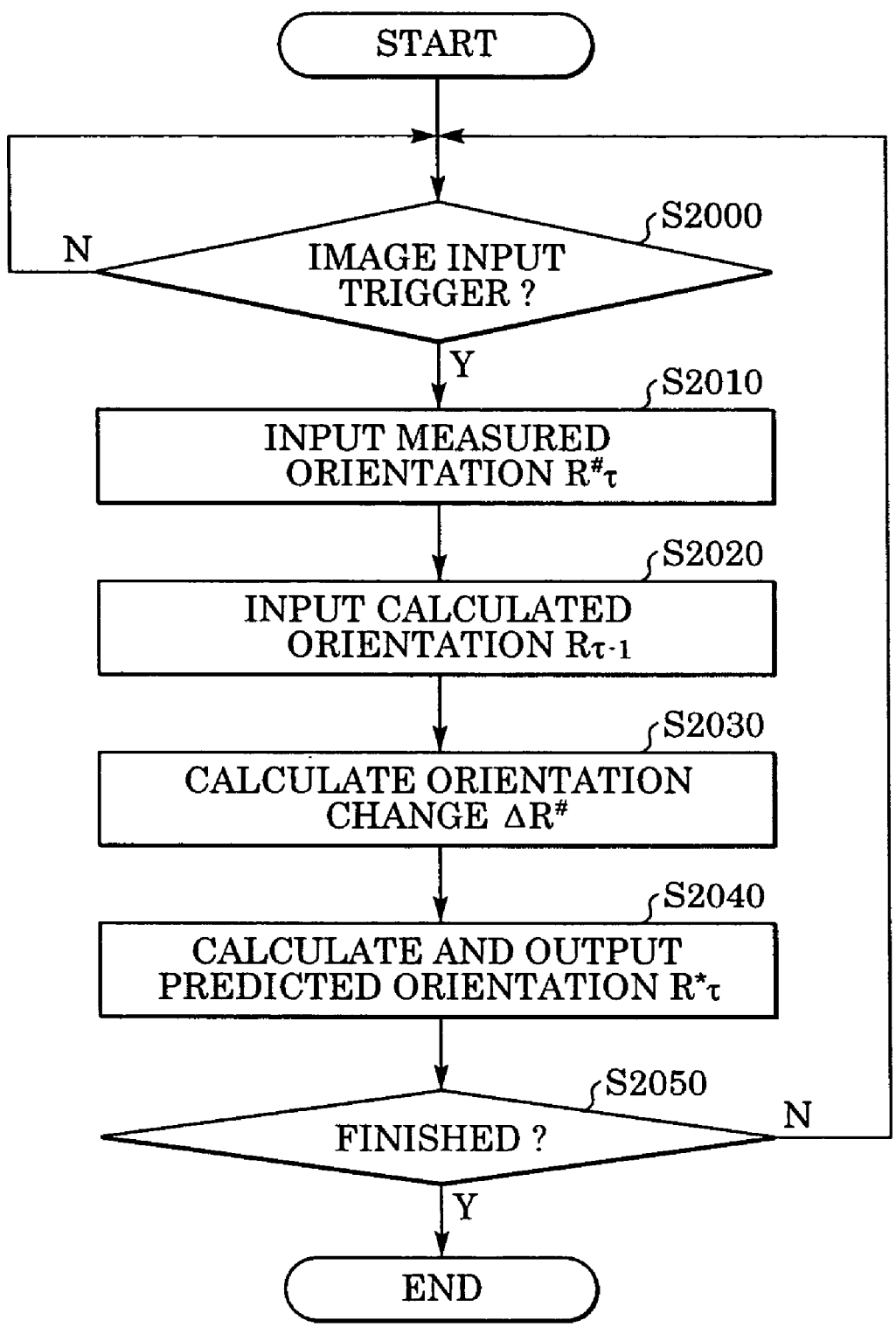
FIG. 2 is a flowchart showing a process performed by an orientation prediction unit included in the known position/orientation determination apparatus which determines the position and orientation of the imaging device.
Figure 3:
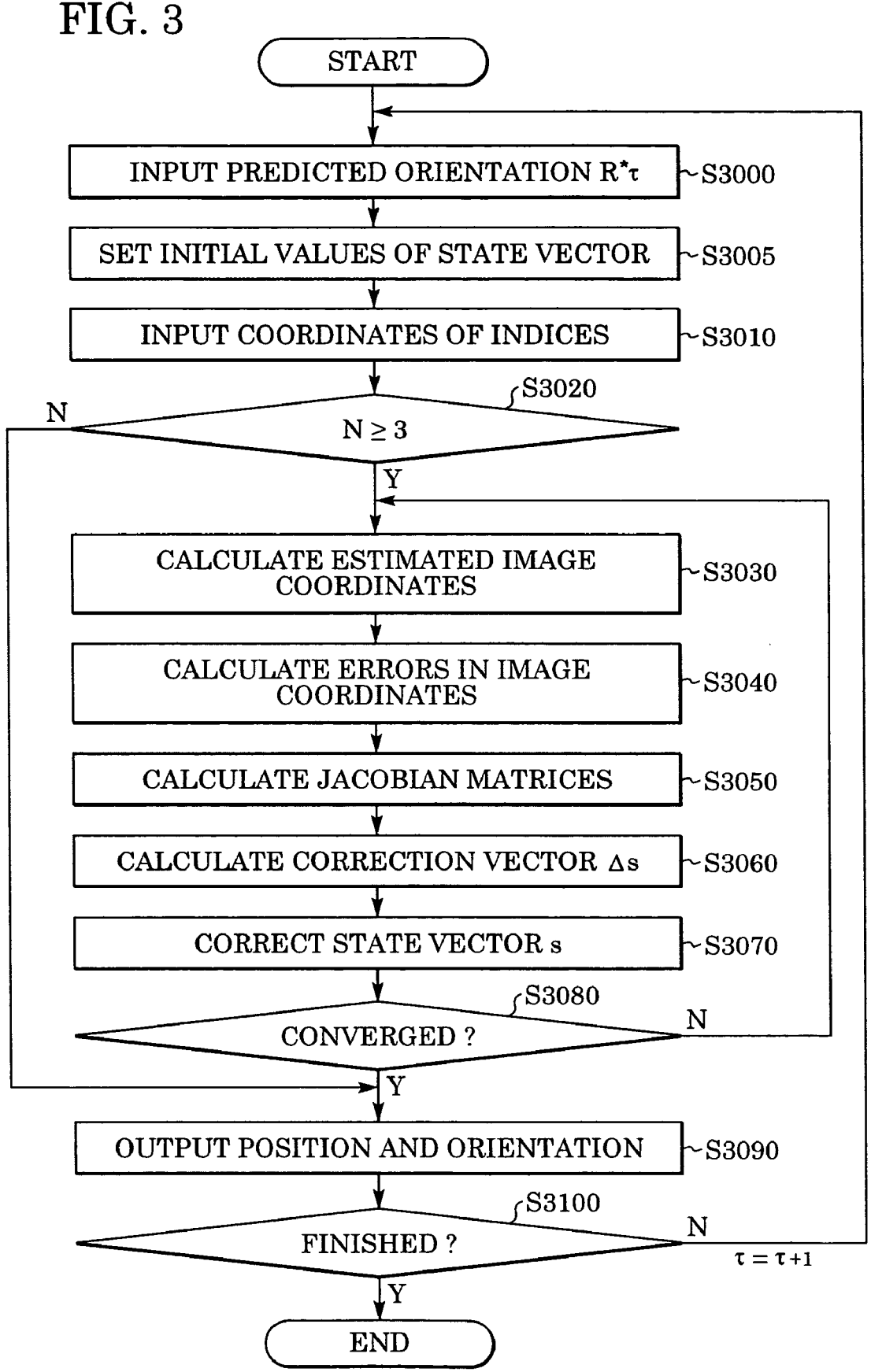
FIG. 3 is a flowchart showing a process performed by a position/orientation calculator included in the known position/orientation determination apparatus which determines the position and orientation of the imaging device.

In FIG. 8, components similar to those shown in FIGS. 1 and 4 are denoted by the same reference numerals, and explanations thereof are thus not repeated here. The present embodiment is different from the first embodiment in that an image obtained by the imaging device 830 is input to the image input unit 160 as the shot image, the orientation prediction unit 450 predicts the orientation of the imaging device 830, and the orientation sensor unit 140 is attached to the imaging device 830.

The imaging device 830 is fixed to a target object 880. The position and orientation of the target object 880 in the camera coordinate system are known in advance.

The position/orientation calculator 820 receives a predicted orientation R* of the imaging device 830 and a set of image coordinates $u^{Qkn}$ and world coordinates $x_W^{Qkn}$ of each index $Q_{kn}$ detected by the index detector 110 from the data memory 170. Then, the position/orientation calculator 820 calculates the position and orientation of the imaging device 830 by a process similar to that performed by the position/orientation calculator 420 in the first embodiment. In addition, the position/orientation calculator 820 outputs the calculated position t to the data memory 170, and updates an azimuth-drift-error correction value of the orientation sensor unit 140 stored in the data memory 170 with an update value φ for the azimuth-drift-error correction value. The update value φ is derived in the step of calculating the position and orientation.

In addition, the position/orientation calculator 820 calculates the position and orientation of the target object 880 on the basis of the calculated position and orientation of the imaging device 830 (in the world coordinate system) and the position and orientation of the target object 880 in the camera coordinate system which are known in advance. The thus calculated position and orientation are output to an external device via the I/F 1009.

Accordingly, a position and an orientation of an arbitrary target object are determined.

In the present embodiment, the position/orientation calculator 820 determines the position and orientation of the imaging device 830, and then determines the position and orientation of the target object 880. However, the position and orientation of the target object 880 may also be directly determined. In such a case, the orientation prediction unit 450 predicts the orientation of the target object 880 using Equation 13 in which $R_{SC}$ is changed to a 3-by-3 matrix which transforms the orientation in a target object coordinate system into that in the sensor coordinate system, and sets a state vector s' including the position of the target object 880. In addition, Equation 16 for obtaining the camera coordinates $x_C^{Qkn}$ of the indices is rewritten as Equation 19 follows:

$$x_C^{Q_{k_n}} = \begin{bmatrix} x_C^{Q_{k_n}} \\ y_C^{Q_{k_n}} \\ z_C^{Q_{k_n}} \end{bmatrix} = R_{CO} \cdot (\Delta R(\phi) \cdot R_\tau^*)^{-1} (x_W^{Q_{k_n}} - \begin{bmatrix} x \\ y \\ z \end{bmatrix}) + t_{CO} \quad (19)$$

where $R_{CO}$ is a matrix which transforms the orientation in the target object coordinate system (a coordinate system defined by an origin positioned at a certain point on the target object 880 and X, Y, and Z axes which are perpendicular to each other) into that in the camera coordinate system, and $t_{CO}$ is a vector which transforms the position in the target object coordinate system into that in the camera coordinate system. $R_{CO}$ and $t_{CO}$ are calculated in advance on the basis of the position and orientation of the target object 880 in the camera coordinate system which are known in advance.

Third Embodiment

In the above-described embodiments, the update value φ for the azimuth-drift-error correction value of the orientation sensor unit is determined as an unknown parameter. However, when the orientation sensor unit has high accuracy, when the orientation sensor unit is used only for a short time, or when the update value for the azimuth-drift-error correction value can be input manually, parameters to be determined by the position/orientation calculator may be limited to the position of the imaging device. A position/orientation determination apparatus according to a third embodiment determines a position and an orientation of an imaging device, and is structured similarly to the position/orientation determination apparatus according to the first embodiment except for the function of the position/orientation calculator 420. The position/orientation determination apparatus and a position/orientation determination method according to the third embodiment are described below.

In the present embodiment, the update value φ according to the first embodiment is set to 0. More specifically, the position/orientation calculator 420 according to the present embodiment expresses unknown parameters to be determined by a three-element state vector $S''=[x\ y\ z]^T$. In addition, the position/orientation calculator 420 according to the present embodiment performs a process similar to that performed by the position/orientation calculator 420 according to the first embodiment (calculations of Jacobian matrices, Equation 16, etc.) except the terms regarding the update value φ are omitted. For example, Equation 16 may be rewritten as Equation 20 for obtaining the camera coordinates $x_C^{Qkn}$ from the world coordinates $x_W^{Qkn}$ and s'' as follows:

$$x_C^{Q_{k_n}} = \begin{bmatrix} x_C^{Q_{k_n}} \\ y_C^{Q_{k_n}} \\ z_C^{Q_{k_n}} \end{bmatrix} = R^{*-1}(x_W^{Q_{k_n}} - \begin{bmatrix} x \\ y \\ z \end{bmatrix}) \quad (20)$$

According to the position/orientation determination apparatus of the present embodiment, the number of unknown parameters to be determined is reduced, and accordingly the stability of the solution (the position and orientation of the imaging device 130) is further increased.

In the case in which the update value for the azimuth-drift-error correction value is manually input, a correction-value-updating unit may be added to the structure shown in FIG. 4. The correction-value-updating unit receives the update value φ for the azimuth-drift-error correction value in accordance with an input from the operator, and updates the azimuth-drift-error correction value φ* stored in the data memory 170 in accordance with Expression 18. The correction-value-updating unit may use particular keys included in the keyboard 1004 as an interface. For example, a '+' key may be used for increasing the update value by 0.1 degrees, and a '−' key may be used for reducing the update value by 0.1 degrees. The correction-value-updating unit may also be optionally used in the structure according to the first embodiment in which the update value for the azimuth-drift-error correction value is determined on the basis of the image information.

Fourth Embodiment

In the above-described embodiments, unknown parameters to be determined are fixed to either both or only one of the position and the update value φ for the azimuth-drift-error correction value. However, it is not necessary to fix the unknown parameters, and estimation of the position and orientation can be performed by changing the unknown parameters in accordance with the characteristics of each parameter. A position/orientation determination apparatus according to a fourth embodiment determines a position and an orientation of an imaging device, and is structured similarly to the position/orientation determination apparatus according to the first embodiment except for the function of the position/orientation calculator 420. The position/orientation determination apparatus and a position/orientation determination method according to the fourth embodiment are described below.

In the present embodiment, the position/orientation calculator has both the function of the position/orientation calculator according to the first embodiment and the function of the position/orientation calculator according to the third embodiment. Basically, the process of the position/orientation calculator according to the third embodiment, in which only the position is set as the unknown parameter, is performed. In addition, the process of the position/orientation calculator according to the first embodiment, in which both the position and the update value for the azimuth-drift-error correction value are set as unknown parameters, is also performed at every predetermined time interval, for example, once every 10 seconds (300 frames). The time interval at which the azimuth-drift-error correction value is updated can be set in accordance with the drift characteristics of the orientation sensor unit 140, and can be input through an interactive operation by the operator.

According to the position/orientation determination apparatus of the present embodiment, in the case in which the orientation sensor unit 140 has enough accuracy to ignore the azimuth drift as long as the orientation sensor unit 140 is used only for a short time, the azimuth drift can be corrected and the stability of the solution can be increased at the same time.

Fifth Embodiment

In the above-described embodiments, the update value for the azimuth-drift-error correction value is determined on the basis of the image information obtained at a single point in time. However, there is a high correlation between the azimuth drift errors obtained at adjacent frames, and therefore the update value can be more accurately determined by using the information of a plurality of frames. A position/orientation determination apparatus according to a fifth embodiment determines a position and an orientation of an imaging device, and is structured similarly to the position/orientation determination apparatus according to the first embodiment except for the function of the position/orientation calculator 420. The position/orientation determination apparatus and a position/orientation determination method according to the fifth embodiment are described below.

Figure 9:
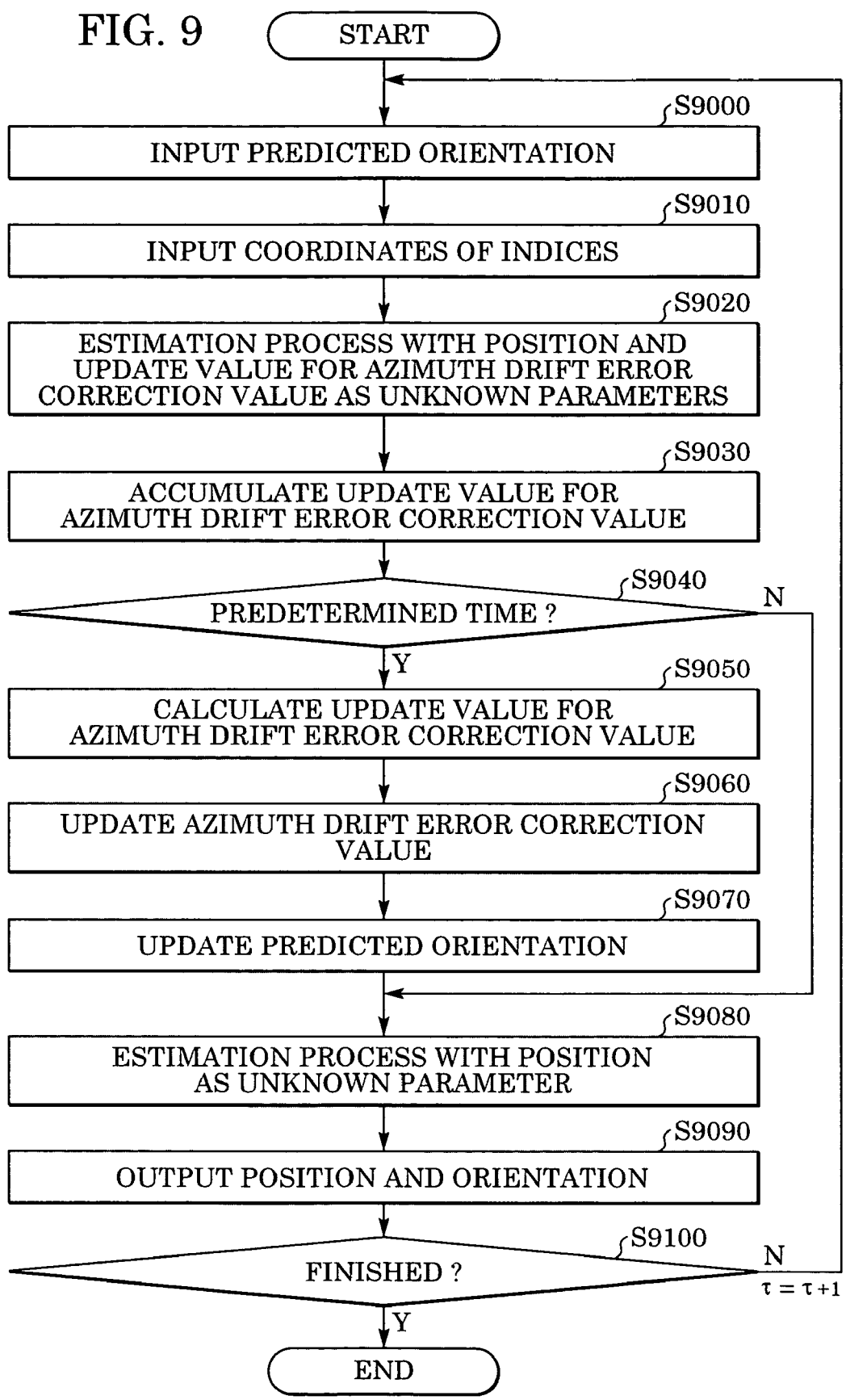
FIG. 9 is a flowchart showing a process of calculating parameters representing a position and an orientation of an imaging device performed when a CPU executes a software program corresponding to a position/orientation calculator.

A position/orientation calculator according to the present embodiment has both the function of the position/orientation calculator according to the first embodiment and the function of the position/orientation calculator according to the third embodiment, and performs the parameter estimation processes of the first and third embodiments at the same time. FIG. 9 is a flowchart showing a process of calculating parameters representing the position and orientation of the imaging device 130. This process is carried out when the CPU 1001 executes a software program corresponding to the position/orientation calculator. The program code corresponding to this flowchart is loaded into the RAM 1002 before the process is started.

In Step S9000, similar to Step S7000 in the first embodiment, the position/orientation calculator receives a predicted orientation R* of the imaging device 130 (output from the orientation prediction unit 450) from the data memory 170.

In Step S9010, similar to Step S7010 in the first embodiment, the position/orientation calculator receives image coordinates of indices detected by the index detector 110 and world coordinates thereof from the data memory 170.

In Step S9020, the position/orientation calculator estimates the position $t=[x\ y\ z]^T$ of the imaging device 130 and the update value $\phi$ for the azimuth-drift-error correction value of the orientation sensor unit 140 as unknown parameters by performing steps similar to Steps S7005 and S7020 to S7080 in the first embodiment.

In Step S9030, the position/orientation calculator accumulates the update value $\phi$ for the azimuth-drift-error correction value calculated at Step S9020, and determines the accumulated update value $\phi_{SUM}$.

In Step S9040, the position/orientation calculator determines whether or not the accumulation is performed for a predetermined number of frames (for example, 30 frames). The process proceeds to Step S9050 if the accumulation is performed for the predetermined number of frames, and to Step S9080 if the accumulation is not performed for the predetermined number of frames.

In Step S9050, the position/orientation calculator calculates the average update value by dividing the accumulated update value $\phi_{SUM}$ obtained at Step S9030 by the number of frames. The thus calculated average is set as a new update value $\phi$ for the azimuth-drift-error correction value. Then, the accumulated value $\phi_{SUM}$ is cleared to 0.

In Step S9060, similar to Step S7095 in the first embodiment, the position/orientation calculator updates the azimuth-drift-error correction value $\phi^*$ stored in the data memory 170 using the update value $\phi$ for the azimuth-drift-error correction value obtained at Step S9050 in accordance with Expression 18.

In Step S9070, the position/orientation calculator calculates the orientation of the imaging device 130 from Equation 17 using the update value $\phi$ for the azimuth-drift-error correction value obtained at Step S9050, and sets the calculated orientation as a new predicted orientation.

In Step S9080, the position/orientation calculator estimates the position $t=[x\ y\ z]^T$ of the imaging device 130 as unknown parameters by performing steps similar to those in the third embodiment.

In Step S9090, similar to Step S7090 in the first embodiment, the position/orientation calculator outputs the information of the position and orientation of the imaging device 130.

In Step S9100, the position/orientation calculator determines whether or not to finish the process. If the process is to be continued, the process returns to Step S9000 and input data corresponding to the next frame (time $\tau+1$) and the following frames is subjected to a similar process.

Accordingly, since the information of a plurality of frames is used, the accuracy of the update value for the azimuth-drift-error correction value is increased. Although the average of the update values obtained at the frames is used in the present embodiment, the mean value of the update values or any other low-pass filters may also be used. In addition, the position/orientation calculator according to the present embodiment may also be applied as the position/orientation calculator according to the fourth embodiment in which the position and the update value for the azimuth-drift-error correction value are set as the unknown parameters.

First Modification

In each of the above-described embodiments, a Gauss-Newton method expressed by Equation 11 is used for calculating the correction vector $\Delta s$ from the error vector U and the matrix $\Theta$. However, it is not necessary to calculate the correction vector $\Delta s$ by the Gauss-Newton method. For example, a Levenberg-Marquardt (LM) method, which is a known iterative solution of nonlinear equations, a statistical method like M-estimation, which is a known robust estimation, or any other numerical calculation methods may also be used within the scope of the present invention.

Second Modification

In each of the above-described embodiments, indices which each corresponds to a single coordinate set (hereafter called point indices) are used as the indices Q. However, the above-described embodiments are characterized in that the degree of freedom of the unknown parameters is limited depending on the result of sensor measurement and the remaining unknown parameters are calculated by the iterative solution of nonlinear equations. Accordingly, the kind of the indices is not limited in any of the above-described embodiments.

For example, markers having particular geometric shapes like those used in a known position/orientation determination apparatus (refer to, for example, Takahashi, Ishii, Makino, and Nakashizu, High-Accuracy Realtime Estimation Method of Position/Orientation of Rectangular Marker by Monocular Vision for VR Interface, Proceedings of 3D Image Conference '96, pp. 167-172, 1996 (in Japanese)) may also be used as the indices. In the case in which rectangular markers are used, world coordinates of the vertices of each rectangle are stored in advance as known values (or the world coordinates are calculated from the position, orientation, and size of the marker). Accordingly, by detecting the image coordinates of each vertex from the image, effects similar to those of the indices according to the above-described embodiments can be obtained.

In addition, indices having line characteristics (hereafter called line indices) like those used in another known position/orientation determination apparatus (refer to, for example, D. G. Lowe, Fitting Parameterized Three-Dimensional Models to Images, IEEE Transactions on PAMI, vol. 13, no. 5, pp. 441-450, 1991) may also be used. As a reference for evaluating the distance of each line indices from the origin, an error vector U may be formed by errors $\Delta d$ calculated from the detection value d obtained from the image and the estimated value d* obtained from the state vector s', and the matrix $\Theta$ may be formed by arranging 1-row by 6-column Jacobian matrices $J^{ds'}$ $(=\partial d/\partial s')$ having elements obtained by partial differentiation of the equation for calculating d* with the elements of the state vector s'. Accordingly, the position and orientation can be determined similarly to the above-described embodiments. In addition, by accumulating the errors and image Jacobians obtained by the line indices, the point indices, and other kinds of indices, all of their features can be used together.

Third Modification

Although only one imaging device 830 is provided in the second embodiment, a plurality of imaging devices may also be attached to the target object 880 for determining the position and orientation. In such a case, the image input unit 160 and the index detector 110 process the input image obtained from each camera. In addition, the orientation prediction unit 450 and the position/orientation calculator 820 perform calculations based on the position and orientation of the target object 880. The position/orientation calculator 820 sets a state vector s' including the position of the target object 880 and the update value for the azimuth-drift-error correction value. The error and image Jacobian for each index are obtained from Equation 19 ($R_{CO}$ and $t_{CO}$ are different for each camera) using the information of the indices obtained from each image, and the error vector U and the matrix $\Theta$ are obtained by accumulating the errors and the image Jacobians. Accordingly, the position and orientation can be estimated similarly to the above-described embodiments.

In addition, although only one imaging device 130 is provided as a target object in the first embodiment, even when positions and orientation of two imaging devices are to be determined in, for example, a stereo video see-through head mount display, the position/orientation determination can be similarly performed by setting one of the imaging devices (for example, an imaging device for a left eye) as a reference.

Fourth Modification

In each of the above-described embodiments, the orientation sensor unit which causes an azimuth drift error is used. However, other orientation sensor units which cause a significant error only in the azimuth angle may also be used. For example, when an orientation sensor unit which measures inclination angles with acceleration sensors and an azimuth angle with geomagnetic sensors is used, the position and orientation of a target object may be determined similarly to the above-described embodiments by setting the position and the update value for the azimuth-drift-error correction value as unknown parameters. In this case, however, the characteristics of the errors are different from those of the azimuth drift errors, and therefore this structure is not suitable for applying the fourth and fifth embodiments. In addition, in the case in which an orientation sensor unit which measures only the inclination angles is used, the position and the orientation of the target object may be determined by a similar process by assuming the sensor unit as a three-axis orientation sensor unit in which the measurement value of the azimuth angle is always 0.

Other Embodiments

The present invention may also be achieved by supplying a system or an apparatus with a storage medium (memory medium) which stores program code of a software program for implementing the functions of the above-described embodiments and causing a computer (or CPU or MPU (micro-processing unit)) of the system or the apparatus to read and execute the program code stored in the storage medium. In such a case, the program code itself which is read from the storage medium provides the functions of the above-described embodiments. In addition, the functions of the above-described embodiments may be achieved not only by causing the computer to read and execute the program code but also by causing an operating system (OS) running on the computer to execute some of the process on the basis of instructions of the program code.

Furthermore, the functions of the above-described embodiments may also be achieved by writing the program code read from the storage medium to a memory of a function extension board inserted in the computer or a function extension unit connected to the computer and causing a CPU of the function extension board or the function extension unit to execute some or all of the process on the basis of instructions of the program code.

In the case in which the present invention is applied to a storage medium as described above, program code corresponding to the above-described flowcharts are stored in the recording medium.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-144892 filed May 14, 2004, which is hereby incorporated by reference herein.

What is claimed is:

1. A position/orientation determination method for determining a position and an orientation of a target object, the position/orientation determination method comprising:
   an image input step of inputting a shot image obtained from an imaging device attached to the target object;
   an orientation input step of inputting a measured orientation obtained from an orientation sensor which acquires information regarding the orientation of the target object;
   an index detection step of obtaining image coordinates of indices arranged on a scene from the shot image as measured image coordinates; and
   a calculation step of calculating parameters including the position of the target object with regard to inclination angles of the measured orientation of the target object as being within an allowable range, the parameters being calculated such that errors between the measured image coordinates being obtained in the index detection step and their theoretical values being obtained on the basis of the measured orientation and estimated parameters are reduced, using image Jacobians of the theoretical image coordinates with respect to the parameters.

2. The position/orientation determination method according to claim 1, wherein the parameters further include a correction value for correcting an azimuth error of the measured orientation of the target object.

3. The position/orientation determination method according to claim 1, wherein in the calculation step, the position of the target object is calculated with regard to inclination and azimuth angles of the measured orientation of the target object as being within an allowable range.

4. A computer readable storage medium storing a control program for causing a computer to execute a position/orientation determination method for determining a position and an orientation of a target object, the position/orientation determination method comprising:
   an image input step of inputting a shot image obtained from an imaging device attached to the target object;
   an orientation input step of inputting a measured orientation obtained from an orientation sensor which acquires information regarding the orientation of the target object;
   an index detection step of obtaining image coordinates of indices arranged on a scene from the shot image as measured image coordinates; and
   a calculation step of calculating parameters including the position of the target object with regard to inclination angles of the measured orientation of the target object as being within an allowable range, the parameters being calculated such that errors between the measured image coordinates being obtained in the index detection step and their theoretical values being obtained on the basis of the measured orientation and estimated parameters are reduced, using image Jacobians of the theoretical image coordinates with respect to the parameters.

5. A position/orientation determination method for determining a position and an orientation of an imaging device which shoots a scene, the position/orientation determination method comprising:
   an image input step of inputting a shot image obtained from the imaging device;
   an orientation input step of inputting a measured orientation obtained from an orientation sensor which acquires information regarding the orientation of the imaging device;
   an index detection step of obtaining image coordinates of indices arranged on a scene from the shot image as measured image coordinates; and
   a calculation step of calculating parameters including the position of the image device with regard to inclination angles of the measured orientation of the imaging device as being within an allowable range, the parameters being calculated such that errors between the measured image coordinates being obtained in the index detection step and their theoretical values being obtained on the basis of the measured orientation and estimated parameters are reduced, using image Jacobians of the theoretical image coordinates with respect to the parameters.

6. The position/orientation determination method according to claim 5, wherein the parameters further include a correction value for correcting an azimuth error of the measured orientation of the imaging device.

7. The position/orientation determination method according to claim 5, wherein in the calculation step, the position of the imaging device is calculated with regard to inclination and azimuth angles of the measured orientation of the imaging device as being within an allowable range.

8. A computer readable storage medium storing a control program for causing a computer to execute a position/orientation determination method for determining a position and an orientation of an imaging device which shoots a scene, the position/orientation determination method comprising:
   an image input step of inputting a shot image obtained from the imaging device;
   an orientation input step of inputting a measured orientation obtained from an orientation sensor which acquires information regarding the orientation of the imaging device;
   an index detection step of obtaining image coordinates of indices arranged on a scene from the shot image as measured image coordinates; and
   a calculation step of calculating parameters including the position of the imaging device with regard to inclination angles of the measured orientation of the imaging device as being within an allowable range, the parameters being calculated such that errors between the measured image coordinates being obtained in the index detection step and their theoretical values being obtained on the basis of measured orientation and estimated parameters are reduced, using image Jacobians of the theoretical image coordinates with respect to the parameters.

9. A position/orientation determination apparatus for determining a position and an orientation of a target object, the position/orientation determination apparatus comprising:
   an image input unit adapted to input a shot image obtained from an imaging device attached to the target object;
   an orientation input unit adapted to input a measured orientation obtained from an orientation sensor which acquires information regarding the orientation of the target object;
   an index detection unit adapted to obtain image coordinates of indices arranged on a scene from the shot image as measured image coordinates; and
   a calculation unit adapted to calculate parameters including the position of the target object with regard to inclination angles of the measured orientation of the target object as being within an allowable range, the parameters being calculated such that errors between the measured image coordinates being obtained by the index detection unit and their theoretical values being obtained on the basis of the measured orientation and estimated parameters are reduced, using image Jacobians of the theoretical image coordinates with respect to the parameters.

10. The position/orientation determination apparatus according to claim 9, wherein the parameters further include a correction value for correcting an azimuth error of the measured orientation of the target object.

11. The position/orientation determination apparatus according to claim 9, wherein the calculation unit calculates the position of the target object with regard to inclination and azimuth angles of the measured orientation of the target object as being within an allowable range.

12. A position/orientation determination apparatus for determining a position and an orientation of an imaging device which shoots a scene, the position/orientation determination apparatus comprising:

an image input unit which inputs a shot image obtained from the imaging device;

an orientation input unit which inputs a measured orientation obtained from an orientation sensor which acquires information regarding the orientation of the imaging device;

an index detection unit adapted to obtain image coordinates of indices arranged on a scene from the shot image as measured image coordinates; and a calculation unit which calculates parameters including the position of the imaging device with regard to inclination angles of the measured orientation of the imaging device as being within an allowable range, the parameters calculated such that errors between the measured image coordinates being obtained by the index detection unit and their theoretical values being obtained on the basis of the measured orientation and estimated parameters are reduced, using image Jacobians of the theoretical image coordinates with respect to the parameters.

13. The position/orientation determination apparatus according to claim 12, wherein the parameters further include a correction value for correcting an azimuth error of the measured orientation of the imaging device.

14. The position/orientation determination apparatus according to claim 12, wherein the calculation unit calculates the position of the imaging device with regard to inclination and azimuth angles of the measured orientation of the target imaging device as being within an allowable range.

* * * * *